(12) United States Patent
Croak et al.

(10) Patent No.: US 7,756,024 B1
(45) Date of Patent: *Jul. 13, 2010

(54) METHOD AND APPARATUS FOR DYNAMICALLY PROVIDING DIFFERENT CALL SERVICE LEVELS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 868 days.

This patent is subject to a terminal disclaimer.

(21) Appl. No.: 11/112,905

(22) Filed: Apr. 22, 2005

(51) Int. Cl.
*H04L 1/16* (2006.01)
(52) U.S. Cl. ............... 370/230; 370/252; 370/437
(58) Field of Classification Search ......... 370/229–235, 370/332, 395.21
See application file for complete search history.

(56) References Cited

U.S. PATENT DOCUMENTS

| | | | | |
|---|---|---|---|---|
| 5,694,548 | A * | 12/1997 | Baugher et al. | 709/227 |
| 5,898,668 | A * | 4/1999 | Shaffer | 370/230 |
| 6,381,244 | B1 * | 4/2002 | Nishimura et al. | 370/395.21 |
| 7,200,154 | B1 * | 4/2007 | Wu et al. | 370/468 |
| 2002/0026509 | A1 | 2/2002 | Wahl | |
| 2002/0122429 | A1 | 9/2002 | Griggs | |
| 2004/0111461 | A1 * | 6/2004 | Claudatos et al. | 709/200 |
| 2004/0181686 | A1 | 9/2004 | Krause et al. | |
| 2005/0128963 | A1 * | 6/2005 | Gazda et al. | 370/278 |
| 2005/0286438 | A1 * | 12/2005 | Rajkotia | 370/252 |
| 2007/0047527 | A1 * | 3/2007 | Croak et al. | 370/356 |
| 2007/0230342 | A1 * | 10/2007 | Skog | 370/232 |
| 2007/0268909 | A1 * | 11/2007 | Chen et al. | 370/395.21 |

FOREIGN PATENT DOCUMENTS

| | | |
|---|---|---|
| EP | 1286527 | 2/2003 |
| WO | WO 99/18709 | 4/1999 |
| WO | WO 01/45374 | 6/2001 |
| WO | WO 02/51092 | 6/2002 |

OTHER PUBLICATIONS

EPO Search Report dated Jan. 8, 2007, of corresponding European Patent application No. EP 06 11 9495, 3 pages.
Examiner's Report for Canadian Patent Application 2,557,094, Jan. 29, 2008, copy consists of 3 unnumbered pages.
$2^{nd}$ Examination Report for EP Application No. 06119495.7, Apr. 11, 2008, copy consists of 7 unnumbered pages.
Third Examination Report for EP06119495.7, Apr. 3, 2009, copy consists of 6 pages.

* cited by examiner

*Primary Examiner*—Phuc Tran

(57) ABSTRACT

A method and system for providing a quality of service level for at least one call in a communications network is described. In one example, a call request for a particular quality of service level for a call is received. Afterwards, the call is processed as a function of at least one of time of day and day of week, in accordance with the requested quality of service level. In a second example, a request to change a predefined quality of service level for a call on a per call basis is received and subsequently processed.

20 Claims, 4 Drawing Sheets

METHOD AND APPARATUS FOR DYNAMICALLY PROVIDING DIFFERENT CALL SERVICE LEVELS

The present invention relates generally to communication networks and, more particularly, to a method and apparatus for dynamically providing different call service levels in a communications network, e.g., a packet network such as a Voice over Internet Protocol (VoIP) network.

BACKGROUND OF THE INVENTION

In telephony services that are provided over traditional networks, quality of service (QoS) is ensured for all customers as a function of dedicated circuits devoted to a call path. As telephony services migrate to a share voice and data IP network infrastructure, quality of service issues are more complex and variable. Typically, a customer enters into a service level agreement (SLA) with the service provider in order to outline the terms of the QoS level that is to be provided. However, the agreed level of service or SLA is normally a static contract that is not readily modified.

Therefore, a need exists for a method and apparatus that dynamically provides different service levels to customers in a communications network.

SUMMARY OF THE INVENTION

In one embodiment, a method and system for providing a quality of service level for at least one call in a communications network is described. More specifically, a call request for a particular quality of service level for a call is received. Afterwards, the call is processed as a function of at least one of time of day and day of week, in accordance with the requested quality of service level. In a second embodiment, a request to change a predefined quality of service level for a call on a per call basis is received and subsequently processed.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
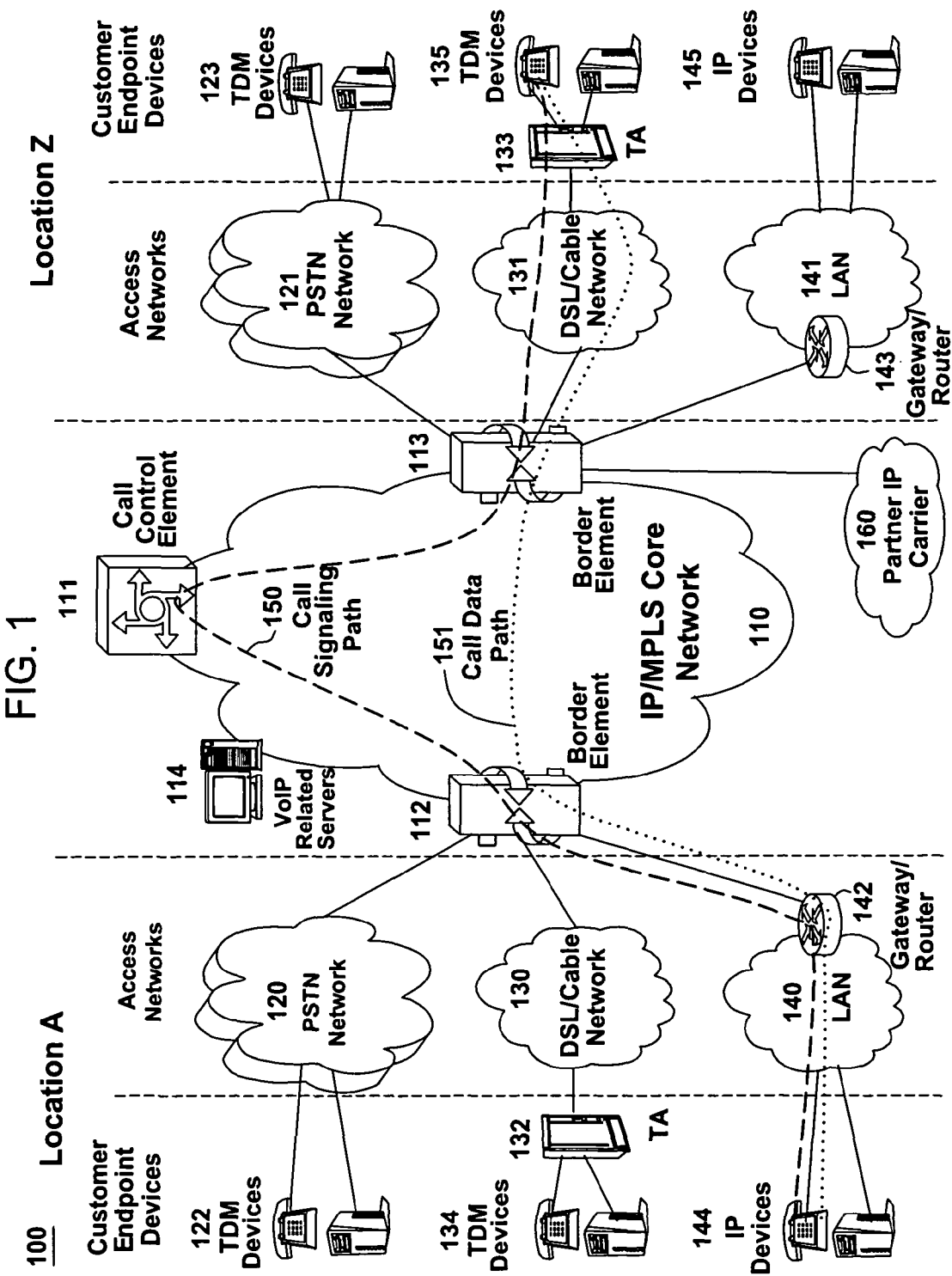
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
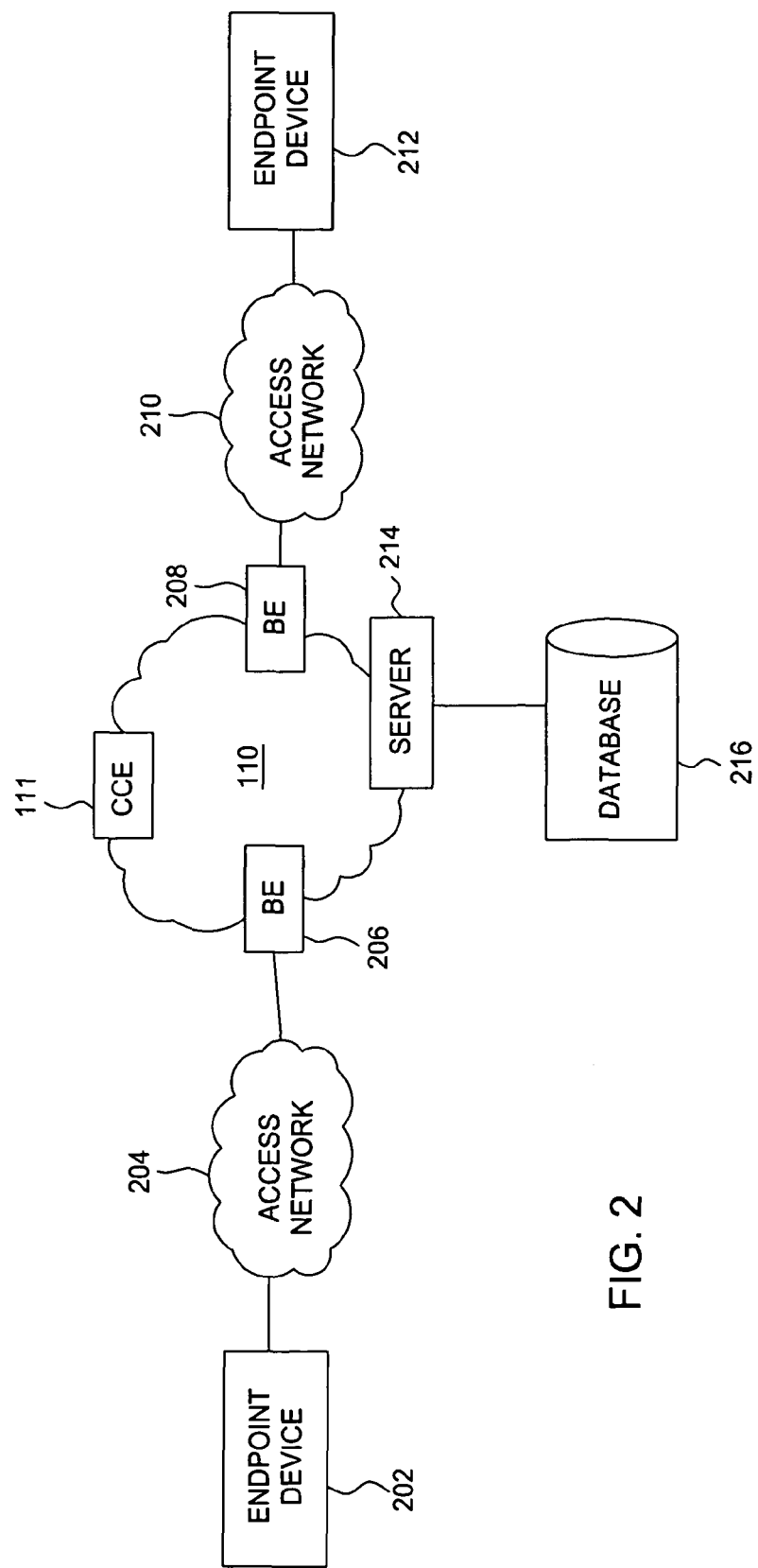
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and a border element (BE) 206. An endpoint device 212 is configured for communication with the core network 110 via an access network 210 and a BE 208. The endpoint device 202 and the endpoint device 212 may comprise any of the customer endpoint devices described above (e.g., TDM devices, IP devices, etc.). The access networks 204 and 210 may comprise any of the access networks described above (e.g., PSTN, DSL/Cable, LAN, etc).

The core network 110 further includes a QoS application server 214 in communication with a QoS configuration database 216 that stores customer QoS settings. In the event the QoS level needs to be modified, the customer may access the database 216 via the network and change the established configuration. This may be accomplished via a touch pad on a telephone (e.g., a TDM phone, IP phone, cellular phone and the like), a personal computer, or other user device. For example, a user may utilize the endpoint device 202 to access the network and make the necessary changes to a predefined QoS level (see below for more detail). Alternatively, a customer may request the assistance of a customer care agent.

In one embodiment, the present invention segments both the network access methods used by the customer and the customer traffic flow that traverses the network. This segmentation permits the service provider to accommodate various QoS levels. Specifically, the segmentation processes are conducted in a manner that allows the invention to conform and support the quality of service tiers that customers may subscribe to. For example, a high level of QoS may entail both a higher quality of access and increased traffic flow within the network. This may be accomplished via special routes (e.g., dedicated access lines) to avoid congestion. Similarly, end-to-end prioritization may be utilized to efficiently transport the customer's mission critical traffic. Alternatively, customers desiring a lower level of QoS would receive a "best effort" type class of traffic flow service and may have to share access lines with other customers. In one embodiment, this invention enables customers to choose quality of service tiers as a function of time of day and day of week parameters. Customers are also enabled to dynamically adjust tiers as a function of their immediate business needs on a per call basis.

Figure 3:
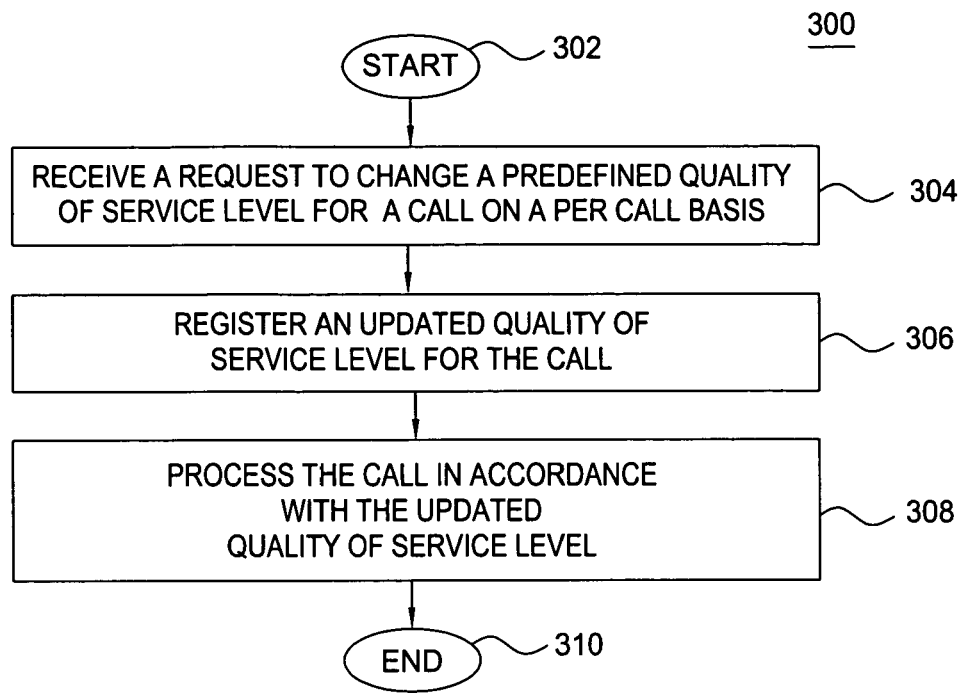
FIG. 3 illustrates a flowchart of a method for dynamically providing a quality of service for a call of the present invention.

FIG. 3 is a flow diagram depicting an exemplary embodiment of a method 300 for dynamically providing a quality of service level for a call in accordance with the present invention. Aspects of the method 300 may be understood with reference to FIGS. 1 and 2. The method 300 begins at step 302. At step 304, a call request for a specific quality of service (QoS) level for a call is received. Quality of service is a networking term that specifies a performance level guaranteed by a service provider. Parameters such as throughput, voice quality, access availability, and the like may contribute to a particular QoS level. For example, a particular QoS level may entail packet travel latency in an end-to-end (e.g., source to destination) system will not exceed a specified delay.

In one embodiment, a customer request for a specific QoS level is received by a QoS application server 214. The request typically includes certain performance requirements needed by the customer. These performance requirements may be a measure of certain parameters such as: packet delay, jitter rates, measured voice quality, calling blocking rates, and other measurable parameters. More specifically, various measurement levels relating to these parameters are used to create specific tiers or levels of quality of service. For example, a "high" level (which may be objectively quantified) of packet delay, i.e., shorter delays, along with an "average" level of measured voice quality may correspond to a particular QoS tier. Notably, a "higher" QoS tier may be designated by an increase in the level of voice quality. The myriad of QoS class types range from the lowest tier (e.g., a best effort class) and the highest tier (dedicated access lines and end-to-end prioritization).

In one embodiment, the present invention enables a customer to customize or choose a QoS tier as a function of the time of day and day of week parameters. Normally, a customer and a service provider agree what type of QoS the customer will receive in a service level agreement (SLA). However, an SLA only permits the provisioning of a single (e.g., static) QoS at all times, i.e., there is no deviation for a particular time frame during the day, or for a specific day of the week (e.g., a weekday vs. a weekend day). Conversely, a customer may utilize this invention to dynamically modify the QoS. For example, the customer may establish the communications capability of a workplace as "high quality" during normal working hours (e.g., time of day) and "low quality" during the evening and on weekends (e.g., day of the week).

At step 306, the call is processed at a quality level specified by the requested QoS level. In one embodiment, the QoS application server 214 processes the particular call in a manner that ensures that the connection between the participating endpoint devices is maintained at the requested quality of service. For example, the request may be implemented by the QoS application server 214 which may utilize special routes in the network to ensure that the desired performance at the specified time of day and day of week is achieved. The QoS application server 214 continuously monitors aspects and parameters of the communication system 100, which include packet delay, jitter rates, measured voice quality, call blocking rates, and the like. If these measurable parameters fall below (or exceed, depending on the nature of the parameter) the desired QoS level, the QoS application server 214 will attempt to remedy the situation itself. Alternatively, the QoS application server 214 may transmit an alarm along with the diagnostic information that has been collected to an appropriate "trouble shooting" center or engineering operations team. The method 300 proceeds to step 308 and ends.

Figure 4:
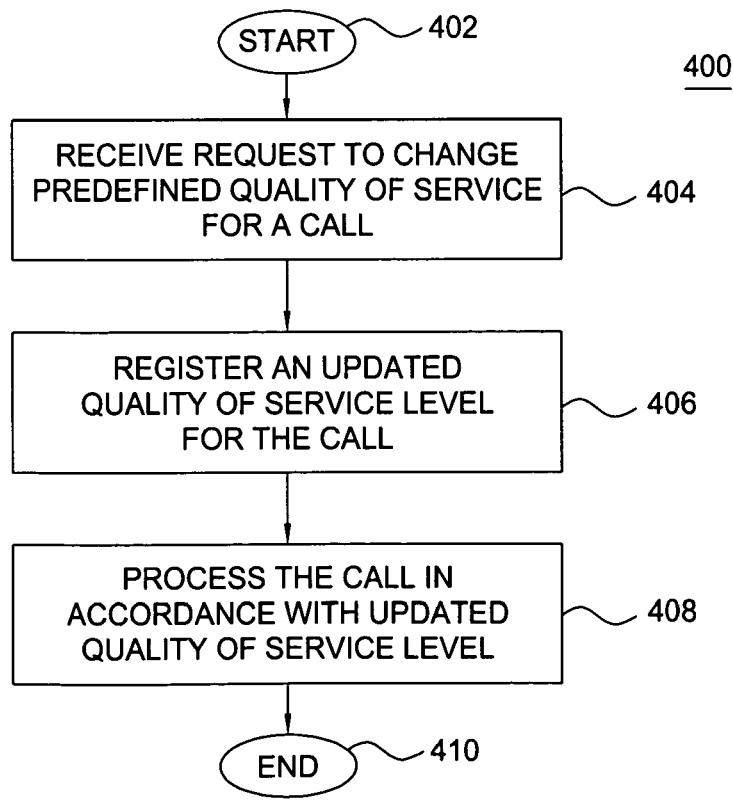
FIG. 4 illustrates a high level block diagram of a general purpose computer suitable for use in performing the functions described herein.

FIG. 4 is a flow diagram of method 400 which is another exemplary embodiment for dynamically providing a quality of service level for a call in accordance with the present invention. Aspects of the method 400 may be understood with reference to FIGS. 1 and 2. The method 400 begins at step 402. At step 404, a request to change a predefined quality of service (QoS) level for a call is received. Typically, a predefined quality of service has previously been established via a service level agreement (SLA) or other arrangement not unlike method 300. However, there may be an occasional need to dynamically modify the QoS level that the customer is contracted to receive on a "per call" basis.

For example, consider the situation where a customer is preparing to conduct a conference call with the CEO of an important client. The customer in this scenario may desire to upgrade the QoS currently being provided to the customer (as agreed in an SLA). The customer may feel that the conference call is of great importance and thus, desires a greater level of guaranteed performance. In this instance, the customer may contact the service provider (via the Internet, a phone touch pad, e.g., Dual Tone Multiple Frequency (DTMF) signal, a customer care agent, and the like) and request that the conference call with the CEO will be handled in accordance to the highest quality or tier (e.g., a dedicated access line with end to end prioritization, high voice quality, etc). Notably, this request may be made despite the fact that under the SLA, the customer is registered to receive a "medium" QoS tier quality.

At step 406, the updated quality of service level for a call is registered. In one embodiment, the server 214 registers the request made in step 404 by modifying the quality of service configuration for the requesting customer. More specifically, this may be done be configuring the customer settings in the database for the particular call.

At step 408, the call is processed in accordance with the quality of the updated service level. In one embodiment, the server 214 will then notify the network to service the call per the parameters requested by the customer. The method 400 then continues to step 410 and ends.

Figure 5:
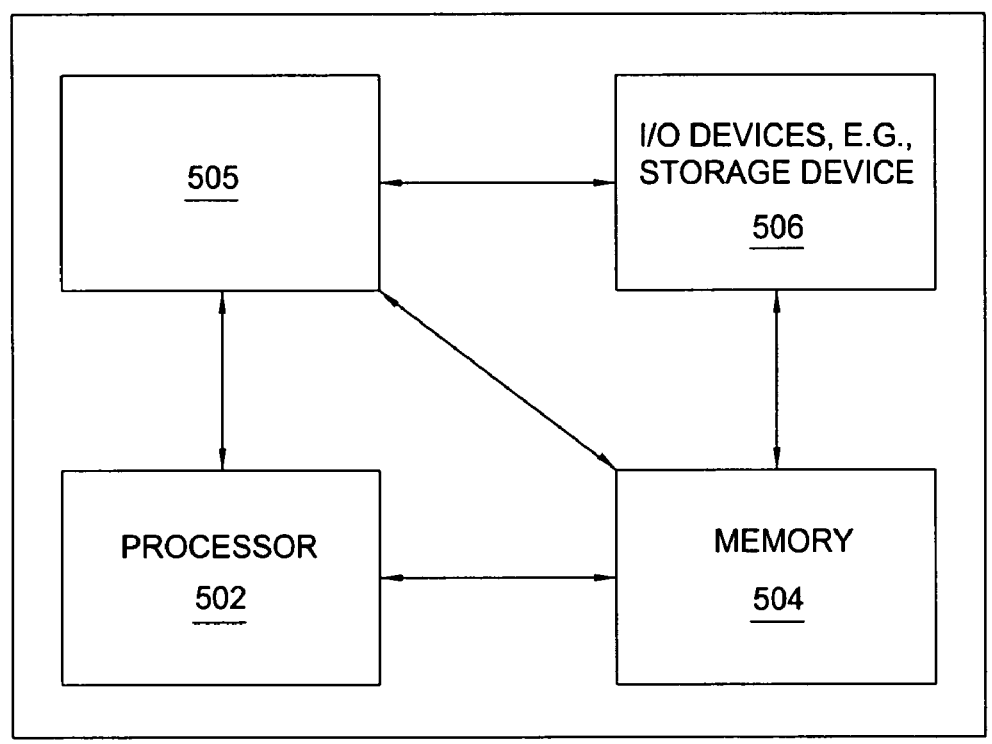
FIG. 5 depicts a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a quality of service processing module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the quality of service processing module or procedure 505 can be loaded into memory 504 and executed by processor 502 to implement the functions as discussed above. As such, the present quality of service processing procedure 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for modifying a predefined quality of service level for at least one call in a communications network, comprising:

establishing said predefined quality of service for all calls associated with a customer in a service level agreement (SLA);

receiving, at a processor, a customer initiated request to change said predefined quality of service level associated with said customer in said SLA on a per call basis for said at least one call;

registering an updated quality of service level for said at least one call by modifying a quality of service configuration for said customer stored in a server in response to said customer initiated request; and processing said at least one call in accordance with said updated quality of service level.

2. The method of claim 1, wherein said communications network is a packet network.

3. The method of claim 2, wherein said packet network is an Internet Protocol (IP) network.

4. The method of claim 1, wherein said request is made via at least one of: a personal computer, a telephone touch pad, or a customer care agent.

5. The method of claim 1, wherein said quality of service level is classified by predefined levels of at least one measurable parameter.

6. The method of claim 5, wherein said at least one measurable parameter comprises at least one of: a packet delay, a jitter rate, a measured voice quality, or a call blocking rate.

7. The method of claim 1, wherein said quality of service level is one of a plurality of quality of service levels.

8. A method for providing a quality of service level for at least one call in a communications network, comprising:

establishing said quality of service level for said at least one call as a function of at least one of: a time of day or a day of week;

receiving, at a processor, a call request for said quality of service level for said at least one call from a customer;

modifying a quality of service configuration for said customer stored in a server in response to said call request from said customer; and processing said at least one call in accordance with said quality of service level.

9. The method of claim 8, wherein said communications network is a packet network.

10. The method of claim 8, wherein said quality of service level is classified by predefined levels of at least one measurable parameter.

11. The method of claim 10, wherein said at least one measurable parameter comprises at least one of: a packet delay, a jitter rate, a measured voice quality, or a call blocking rate.

12. The method of claim 8, wherein said quality of service level is one of a plurality of quality of service levels.

13. The method of claim 8, wherein said packet network is an Internet Protocol (IP) network.

14. The method of claim 8, wherein said request is made via at least one of: a personal computer, a telephone touch pad, or a customer care agent.

15. A non-transitory computer readable medium having stored thereon instructions that, when executed by a processor, cause the processor to perform a method for modifying a predefined quality of service level for at least one call in a communications network, comprising:

establishing said predefined quality of service for all calls associated with a customer in a service level agreement (SLA);

receiving, at a processor, a customer initiated request to change said predefined quality of service level associated with said customer in said SLA on a per call basis for said at least one call;

registering an updated quality of service level for said at least one call by modifying a quality of service configuration for said customer stored in a server in response to said customer initiated request; and processing said at least one call in accordance with said updated quality of service level.

16. The non-transitory computer readable medium of claim 15, wherein said communications network is a packet network.

17. The non-transitory computer readable medium of claim 15, wherein said request is made via at least one of: a personal computer, a telephone touch pad, or a customer care agent.

18. The non-transitory computer readable medium of claim 15, wherein said quality of service level is classified by predefined levels of at least one measurable parameter.

19. The non-transitory computer readable medium of claim 18, wherein said at least one measurable parameter comprises at least one of: a packet delay, a jitter rate, a measured voice quality, or a call blocking rate.

20. The non-transitory computer readable medium of claim 15, wherein said quality of service level is one of a plurality of quality of service levels.

\* \* \* \* \*